United States Patent
Okumura

(10) Patent No.: US 7,274,421 B2
(45) Date of Patent: Sep. 25, 2007

(54) LIQUID CRYSTAL DISPLAY DEVICE WITH ALIGNMENT REGULATING DEVICE DEVIATING FROM CENTER OF SUB-DOT REGIONS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 10/951,697

(22) Filed: Sep. 29, 2004

(65) Prior Publication Data

US 2005/0083479 A1 Apr. 21, 2005

(30) Foreign Application Priority Data

Oct. 21, 2003 (JP) ............................. 2003-360751

(51) Int. Cl.
*G02F 1/1337* (2006.01)
*G02F 1/1343* (2006.01)

(52) U.S. Cl. ...................... 349/130; 349/129; 349/143; 349/144

(58) Field of Classification Search ................. 349/130
See application file for complete search history.

(56) References Cited

U.S. PATENT DOCUMENTS

| 6,384,889 | B1 * | 5/2002 | Miyachi et al. ............. 349/143 |
| 6,710,825 | B2 * | 3/2004 | Kubo et al. .................... 349/48 |
| 6,788,375 | B2 * | 9/2004 | Ogishima et al. ........... 349/130 |
| 6,967,702 | B2 * | 11/2005 | Ishii et al. ................... 349/123 |
| 2005/0078260 | A1 | 4/2005 | Ono et al. |

FOREIGN PATENT DOCUMENTS

| JP | A-10-186330 | 7/1998 |
| JP | A-2000-19522 | 1/2000 |
| JP | A-2000-47251 | 2/2000 |
| JP | A-2001-281664 | 10/2001 |
| JP | A-2002-287158 | 10/2002 |
| JP | A-2003-43525 | 2/2003 |
| JP | A-2003-177384 | 6/2003 |
| JP | A-2003-228073 | 8/2003 |
| JP | A-2003-255395 | 9/2003 |
| JP | A-2003-295192 | 10/2003 |
| KR | A 2002-0015009 | 2/2002 |
| KR | A 2003-0058012 | 7/2003 |

* cited by examiner

*Primary Examiner*—Andrew Schechter
(74) *Attorney, Agent, or Firm*—Oliff & Berridge, PLC

(57) ABSTRACT

Exemplary embodiments provide a vertical alignment type liquid crystal display device capable of enhancing a response speed and display characteristics in a specific viewing angle direction. In a liquid crystal display device of an exemplary embodiment of the present invention, a vertical alignment type liquid crystal layer is interposed between a pair of substrates, and display is performed in predetermined dot regions (D1, D2, and D3). A plurality of sub-dot regions (island-shaped portions) are provided in the dot region D1, and the plurality of sub-dot regions is electrically connected to each other by connecting portions in the dot region D1. Each sub-dot region is provided with a convex portion to regulate the alignment direction of the vertically aligned liquid crystal molecules such that the liquid crystal molecules, are inclined substantially in a radial direction around the convex portion, and the convex portion is arranged so as to deviate from the center of the sub-dot region.

17 Claims, 10 Drawing Sheets

LIQUID CRYSTAL DISPLAY DEVICE WITH ALIGNMENT REGULATING DEVICE DEVIATING FROM CENTER OF SUB-DOT REGIONS

BACKGROUND OF THE INVENTION

1. Field of Invention

An exemplary embodiment of the present invention relates to a liquid crystal display device and an electronic apparatus. More particularly, an exemplary embodiment relates to a liquid crystal display device capable of enhancing display characteristics in a specific viewing angle direction using vertical alignment type liquid crystal.

2. Description of Related Art

Related art liquid crystal display devices adopting a TN mode have had a narrow viewing angle. Therefore, in order to address or solve such a problem, liquid crystal display devices can adopt a VA (Vertical Alignment) mode to widen a viewing angle. In such a VA mode, it is necessary to control the alignment direction of liquid crystal according to the application of a voltage using a certain method. That is, when the VA mode is adopted, negative type liquid crystal is generally used. However, in this case, since the liquid crystal molecules that are vertically aligned with respect to a surface of a substrate in an initial state are inclined by the application of a voltage, specific control means must be provided to control the alignment direction of the liquid crystal molecules. If the alignment direction is not controlled, a display defect, such as light leakage caused by the alignment disorder (disclination) of liquid crystal molecules, may be generated, resulting in the deterioration of display characteristics. Therefore, a technique of regulating the alignment direction of the vertically aligned liquid crystal molecules is disclosed in Japanese Unexamined Patent Application Publication No. 2003-43525.

SUMMARY OF THE INVENTION

In Japanese Unexamined Patent Application Publication No. 2003-43525, one dot, which is a minimum display unit, is divided into a plurality of sub-dots, and the plurality of sub-dots are connected to each other. In addition, a projection is formed at the center of each sub-dot. With such a structure, the liquid crystal molecules can be aligned in a radial direction with the projection as the center when a voltage is applied, thereby realizing display having high contrast and a wide viewing angle in all directions. However, even when the above-mentioned structure is adopted, the display quality of the liquid crystal display device disclosed in Japanese Unexamined Patent Application Publication No. 2003-43525 is not as high as that of a light emitting display device, such as a CRT or a PDP. For example, as for the viewing angle dependence of the liquid crystal display device having the projections therein, twenty percent of transmittance may be lost at a polar angle (an inclination angle in the normal direction of a panel) of 40°, and forty percent of transmittance may be lost at a polar angle of 60°. In addition, there is a problem in that light is distributed in a viewing angle direction that is not used at all. Also, since a sufficient response speed to display a moving picture is not achieved in the conventional liquid crystal display device, tailing can be generated on a displayed image, which is a problem common to all liquid crystal display devices, not limited to only a liquid crystal display device adopting the VA mode.

Accordingly, an exemplary embodiment of the present invention addresses or solves the above, and provides a vertical alignment type liquid crystal display device capable of enhancing a response speed and display characteristics in a specific viewing angle direction.

In order to address or achieve the above, an exemplary embodiment of the present invention provides a liquid crystal display device in which a liquid crystal layer is interposed between a pair of substrates, and display is performed in predetermined dot regions. The liquid crystal layer is composed of liquid crystal having negative dielectric anisotropy that is vertically aligned in an initial state, and a plurality of sub-dot regions is provided in each dot region, the plurality of sub-dot regions being electrically connected to each other through their connecting portions. Each sub-dot region is provided with an alignment regulating device to regulate the alignment direction of the vertically aligned liquid crystal molecules, such that the liquid crystal molecules are inclined substantially in a radial direction around the alignment regulating device. Each alignment regulating device is arranged so as to deviate from the center of the sub-dot region.

An exemplary embodiment of the present invention provides a method of appropriately regulating the alignment direction of liquid crystal molecules when a voltage is applied and of enhancing display characteristics in a specific viewing angle direction, in a vertical alignment type liquid crystal display device, that is, in a liquid crystal display device equipped with a liquid crystal layer composed of liquid crystal having negative dielectric anisotropy that is vertically aligned in an initial state. In other words, by dividing one dot region, which is a display unit, into a plurality of sub-dot regions, each having an alignment regulating device therein, and by connecting the plurality of sub-dot regions each other, it is possible to regulate the alignment direction of the liquid crystal molecules in each sub-dot region, such that the liquid crystal molecules are inclined substantially in a radial direction around the alignment regulating device. In addition, by arranging each alignment regulating device to deviate (to be eccentric) from the center of each of the sub-dot regions, the number of liquid crystal molecules can be different according to the direction in which the liquid crystal molecules are inclined. For example, by eccentrically arranging the alignment regulating device such that the number of liquid crystal molecules is increased in a specific viewing angle direction, it is possible to enhance the brightness of a display screen in a specific viewing angle direction.

Further, in an exemplary embodiment of the present invention, since the alignment regulating device is eccentrically arranged, a region in which the distance between the outer circumference of the sub-dot region and the alignment regulating device is small and a region in which the distance therebetween is large are formed. Since the liquid crystal molecules are sequentially inclined with the alignment regulating device as a starting point, the response speed of the liquid crystal molecules is fast in the region in which the distance is small, and the response speed of the liquid crystal molecules is delayed in the region in which distance is large. From the view of the average response characteristic with respect to the entire dot, compared to a case in which the alignment regulating device is arranged at the center of a sub-dot, the response speed is delayed in a dot region having the ratio (emittance) of incident light to emission light in the range of 0% to 90%, and the response speed becomes fast in a dot region having the ratio of incident light to emission light in the range of 0% to 60%. In other words, it is possible to increase a response speed by eccentrically arranging the alignment regulating means to obtain emittance in the range of 0% to 60%, which is a great advantage in the display of a moving picture. For example, it is possible to enhance the contrast of an object moving at a high speed.

The liquid crystal display device according to an exemplary embodiment of the present invention is a display device suitable for a navigation system or a personal computer. That is, such a display device mainly displays a moving picture, and the display device for a navigation system is mainly viewed from the 2 o'clock direction (a driver's seat) or the 10 o'clock direction (the seat next to the driver). Therefore, it may be preferable to eccentrically arrange the alignment regulating device such that the liquid crystal molecules are inclined in the above-mentioned direction. In addition, the display device for a personal computer is mainly viewed from the front. That is, the display device is mainly viewed in the 10 o'clock direction, the 12 o'clock direction, or the 2 o'clock direction, but is hardly viewed in the 6 o'clock direction. Therefore, it may be preferable to eccentrically arrange the alignment regulating device such that the liquid crystal molecules are not inclined in the 6 o'clock direction.

In the liquid crystal display device, the alignment regulating device are convex portions formed on a surface of at least one of the pair of substrates facing the liquid crystal layer. In this case, it is possible to regulate the alignment direction of the liquid crystal molecules based on the shapes of the convex portions, and such convex portions can have a structure to regulate the alignment direction of the vertically aligned liquid crystal molecules, based on a change of an electric field (an electric field between electrodes). Specifically, the convex portion protruding from the inner surface of the substrate toward the liquid crystal layer is preferably composed of a cone-shaped or polygonal pyramid-shaped projection having an incline plane that is inclined at a predetermine angle with respect to the surface of the substrate. In addition, it is preferable that the surface (the incline plane) of the convex portion be formed to be inclined at a predetermined angle with respect to the alignment direction of the liquid crystal molecules. The incline plane of the convex portion preferably has the maximum inclination angle of 2° to 20°. In this case, the inclination angle is an angle formed between the incline plane of the convex portion and the substrate. In addition, when the convex portion has a curved surface, the inclination angle indicates an angle formed between the surface of the substrate and a surface tangent to the curved surface of the convex portion. In this case, when the maximum inclination angle is less than 2°, it may be difficult to regulate the direction in which the liquid crystal molecules are inclined. When the maximum inclination angle is more than 20°, light leakage may be generated from that portion, resulting in a display defect, such as the deterioration of contrast.

Further, electrodes are formed on both surfaces of the pair of substrates facing the liquid crystal layer, and each electrode slit, functioning as the alignment regulating device, is formed by partially cutting off the electrode that is formed on at least one of both the surfaces of the pair of substrates facing the liquid crystal layer. As a result, the alignment direction of liquid crystal molecules can be regulated by forming the slit in each electrode. That is because an inclined electric field is generated between the slit formed by cutting off a portion of an electrode and another electrode opposite to the slit, and the alignment direction of the liquid crystal molecules having a vertical alignment in an initial state is regulated by the inclined electric field when a voltage is applied.

The alignment regulating device has a shape that is in point symmetry or substantially in point symmetry with respect to its center in plan view. Therefore, it is possible to more reliably align liquid crystal molecules in a radial direction with the alignment regulating device as the center by arranging the alignment regulating device as described above. Specifically, the alignment regulating device has a circular shape, a regular polygonal shape, a substantially circular shape, or a substantially regular polygonal shape in plan view.

Further, the sub-dot region has a shape that is in point symmetry or substantially in point symmetry with respect to its center in plan view. In this case, it is possible to more reliably align the liquid crystal molecules in a radial direction in each sub-dot region. Specifically, the sub-dot region has a circular shape, a regular polygonal shape, a substantially circular shape, or a substantially regular polygonal shape in plan view.

Furthermore, the plane shape of the alignment regulating device is similar to or substantially similar to that of the sub-dot region. In this case, it is possible to more reliably align the liquid crystal molecules in a radial direction in each sub-dot region with the alignment regulating device as the center without generating the alignment disorder of the liquid crystal molecules. When the alignment regulating device and the sub-dot region are respectively formed in a polygonal shape in plan view, each side of the alignment regulating device and each side of the sub-dot region are parallel to each other, thereby reducing or preventing the alignment disorder of the liquid crystal molecules.

Moreover, the alignment regulating device in at least two or more of the plurality of sub-dot regions are located at different distances and/or in different directions from the centers of the respective sub-dot regions. In this case, it is possible to obtain different viewing angle characteristics from the respective sub-dot regions. For example, the plurality of sub-dot regions includes sub-dot regions for transmissive display and sub-dot regions for reflective display, and the alignment regulating device in the sub-dot regions for transmissive display and the alignment regulating device in the sub-dot regions for reflective display are located at different distances and/or in different directions from the centers of the respective sub-dot regions, thereby obtaining different viewing angle characteristics in transmissive display and reflective display.

The alignment regulating device is arranged so as to deviate from the center of each sub-dot region, in the direction in which a viewing angle is widened in the display of the liquid crystal display device. That is, the position of the alignment regulating device in the sub-dot region and the direction of widening a viewing angle are related to each other. For example, in a liquid crystal display device in which the pair of substrates is an upper substrate and a lower substrate, and a backlight is formed on a surface of the lower substrate opposite to the liquid crystal layer to display an image on an outer surface of the upper substrate, when the alignment regulating device is provided on an inner surface of the upper substrate, the alignment regulating device is arranged so as to deviate from the center of the sub-dot region in a direction opposite to the direction in which a viewing angle is widened in the display of the liquid crystal display device. On the other hand, when the alignment regulating device is provided on an inner surface of the lower substrate, the alignment regulating device is arranged so as to deviate from the center of the sub-dot region in a direction similar to the direction in which a viewing angle is widened in the display of the liquid crystal display device.

Since the alignment regulating device of an exemplary embodiment of the present invention regulates the liquid crystal molecules to be inclined in a radial direction in its circumference, the liquid crystal molecules can be aligned in the opposite direction depending on which of the upper substrate and the lower substrate the alignment regulating device is formed. When the alignment regulating device is formed on the upper substrate, it is preferable that the alignment regulating device be arranged so as to deviate from the center of the sub-dot region in a direction opposite to the direction in which a viewing angle is widened. On the other hand, when the alignment regulating device is formed on the lower substrate, it is preferable that the alignment regulating device be arranged so as to deviate from the center of the sub-dot region in a direction similar to the direction in which a viewing angle is widened. In addition, the eccentric direction of the alignment regulating device, that is, the direction opposite to or similar to the direction in which a viewing angle is widened, depends on the inclined direction of the liquid crystal molecules. Particularly, when the convex portion or the electrode slit, functioning as an alignment regulating device, is used to align the liquid crystal molecules in a radial direction in its circumference, more specifically, to radially align the liquid crystal molecules toward the outside thereof, it may be preferable to arrange the alignment regulating device so as to deviate from the center of the sub-dot region as in the above-mentioned aspects.

Further, when the distance from the center of the sub-dot region to an outer circumference thereof via the center of the alignment regulating device is "y", the center of the alignment regulating device is arranged so as to be separated from the center of the sub-dot region by a distance of 0.05y to 0.7y. It is possible to more reliably enhance display characteristics in a specific viewing angle direction by separating the center of the alignment regulating device from the center of the sub-dot region by such a distance. When the distance is less than 0.05y, the fact that the position where the maximum brightness (transmittance) is obtained deviates from the front may not be recognized. When the distance is more than 0.7y, the alignment regulating device excessively leans to one side, thereby generating the alignment disorder of the liquid crystal molecules.

Furthermore, the pair of substrates is an upper substrate and a lower substrate, and a reflective layer is provided on a surface of the lower substrate facing the liquid crystal layer to display an image on an outer surface of the upper substrate. The structure of the alignment regulating device according to an exemplary embodiment of the present invention can be applied to a reflective liquid crystal display device other than the transmissive liquid crystal display device. In such a reflective liquid crystal display device, when the distance from the center of the sub-dot region to the outer circumference thereof via the center of the alignment regulating device is "y", the center of the alignment regulating device is arranged so as to be separated from the center of the sub-dot region by a distance of 0.5y to 0.7y. In the reflective liquid crystal display device, the alignment of the liquid crystal molecules has an influence on a viewing angle characteristic when light is incident thereon or exits therefrom. Therefore, it may be preferable that the distance between the center of the sub-dot region and the center of the alignment regulating device be as large as possible. However, when the distance is less than 0.5y, the fact that the position where the maximum brightness (the ratio of incident light to emission light) is obtained deviates from the front may not be recognized.

Moreover, it is possible to apply the structure of an exemplary embodiment of the present invention to a transflective liquid crystal display device. That is, the structure of an exemplary embodiment of the present invention can be applied to a liquid crystal display device in which a transmissive display region for transmissive display and a reflective display region for reflective display are provided in each dot. Specifically, the structure of an exemplary embodiment of the present invention can be applied to a liquid crystal display device in which the pair of substrates is an upper substrate and a lower substrate; a backlight is provided on a substrate of the lower substrate opposite to the liquid crystal layer; a reflective layer is selectively provided on only a predetermined region on the other surface of the lower substrate facing the liquid crystal layer; a region in which the reflective layer is formed is a reflective display region; and a region in which the reflective layer is not formed is a transmissive display region.

Moreover, in the transflective liquid crystal display device, a layer to adjust the thickness of the liquid crystal layer can be formed in the reflective display region between the liquid crystal layer and at least one of the pair of substrates, such that the thickness of the liquid crystal layer in the reflective display region is different from the thickness of the liquid crystal layer in the transmissive display region. By selectively forming the layer to adjust the thickness of the liquid crystal layer in the reflective display region, it is possible to make retardation in the reflective display region substantially equal to retardation in the transmissive display region, thereby enhancing contrast.

When the convex portions are used as the alignment regulating device of an exemplary embodiment of the present invention, it is preferable that the convex portions each have a height of 0.05 µm to 1.5 µm. When the height of the convex portions is less than 0.05 µm, it is difficult to regulate the alignment direction of the liquid crystal molecules. On the other hand, when the height of the convex portions is more than 1.5 µm, the difference in retardation between a vertex portion and a bottom portion of the convex portion in the liquid crystal layer becomes large, resulting in the deterioration of display characteristics.

Further, an electronic apparatus according to an exemplary embodiment of the present invention includes the above-mentioned liquid crystal display device. According to the present invention, it is possible to provide an electronic apparatus equipped with a display unit capable of reducing or preventing display defects, such as a residual image and color unevenness, and of exhibiting excellent display characteristics in a specific viewing angle direction.

DETAILED DESCRIPTION OF PREFERRED EMBODIMENTS

Figure 1:
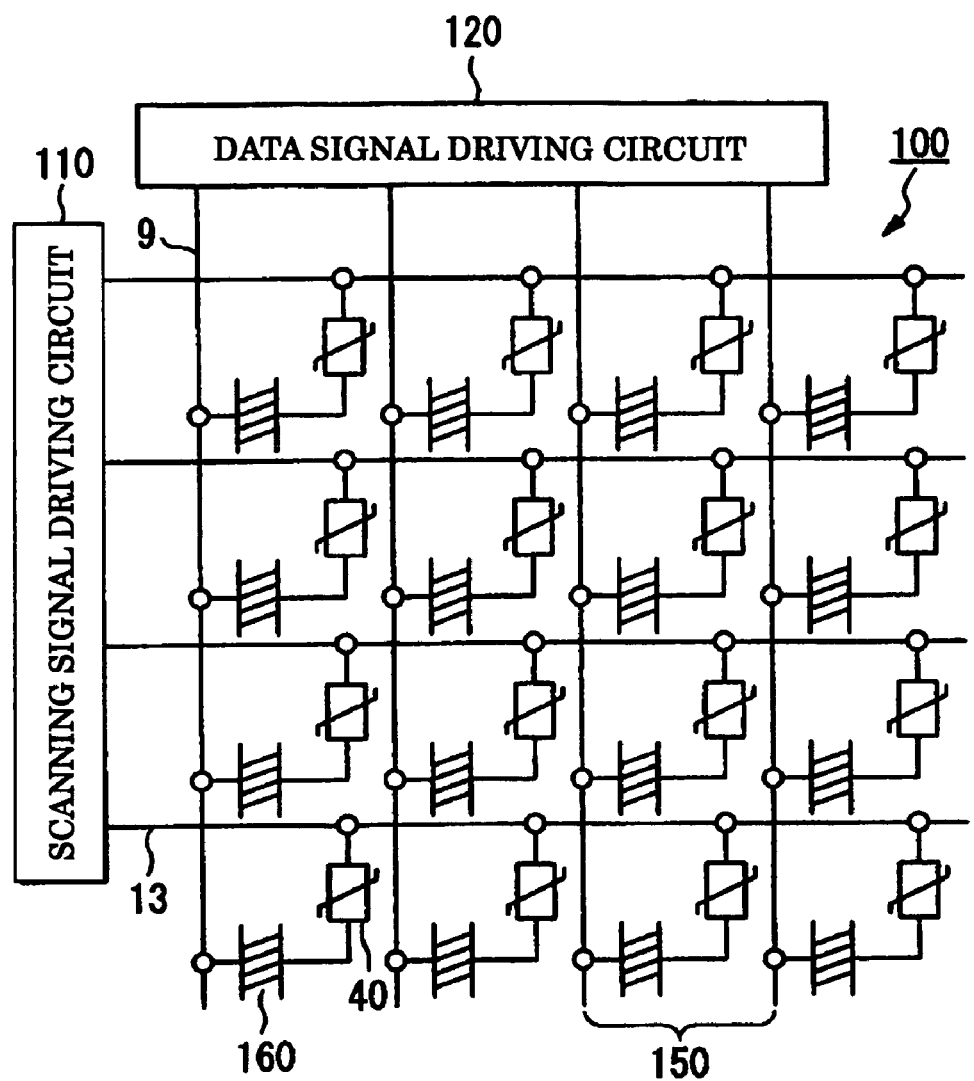
FIG. 1 is a schematic circuit diagram of a liquid crystal display device according to a first exemplary embodiment of the present invention.

Exemplary embodiments of the present invention are described below with reference to the accompanying drawings. In the respective drawings, the reduced scale of each layer or each member is different from the actual scale because each layer or each member is scaled to be recognizable in the drawings.

[First Exemplary Embodiment]

A liquid crystal display device of the present exemplary embodiment, which is described below, is an active matrix liquid crystal display device in which thin film diodes (hereinafter "TFDs") are used as switching elements, and is particularly a transmissive liquid crystal display device using vertical alignment type liquid crystal.

FIG. 1 is a schematic circuit diagram of a liquid crystal display device 100 according to the present exemplary embodiment. The liquid crystal display device 100 includes a scanning signal driving circuit 110 and a data signal driving circuit 120. The liquid crystal display device 100 is provided with signal lines, that is, a plurality of scanning lines 13 and a plurality of data lines 9 intersecting with the plurality of scanning lines 13. The scanning lines 13 are driven by the scanning signal driving circuit 110, and the data lines 9 are driven by the data signal driving circuit 120.

In each pixel region 150, a TFD element 40 is connected in series to a liquid crystal display element 160 (a liquid crystal layer) between the scanning line 13 and the data line 9. In FIG. 1, the TFD element 40 is connected to the scanning line 13, and the liquid crystal display element 160 is connected to the data line 9. On the contrary, the TFD element 40 may be connected to the data line 9, and the liquid crystal display element 160 may be connected to the scanning line 13.

Figure 2:
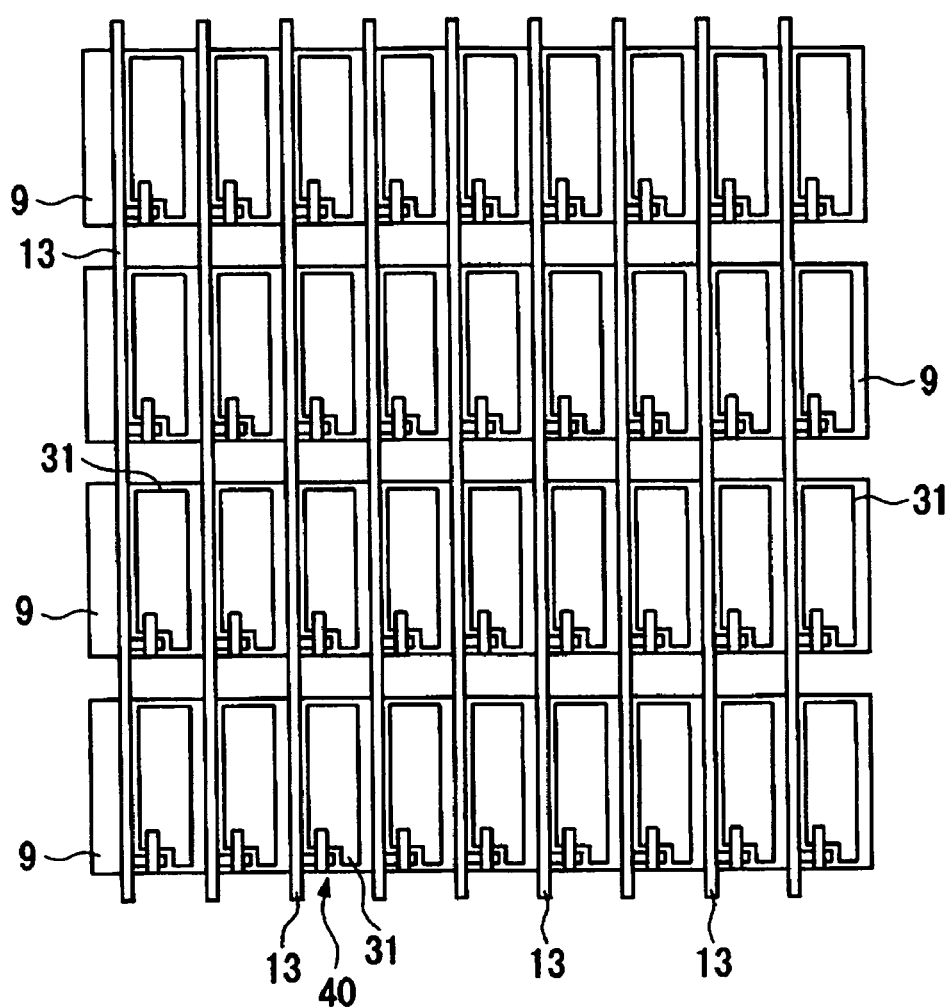
FIG. 2 is a plan view illustrating the dot structure of the liquid crystal display device according to the first exemplary embodiment of the present invention.

Next, the planar structure of electrodes (the structure of pixels) included in the liquid crystal display device 100 according to the present exemplary embodiment is described with reference to FIG. 2. As shown in FIG. 2, in the liquid crystal display device 100 of the present exemplary embodiment, pixel electrodes 31 each of which has a rectangular shape in plan view and is connected to the scanning line 13 through the TFD element 40 are provided in a matrix, and rectangular common electrodes (stripe-shaped electrodes) 9 are provided so as to be opposite to the pixel electrodes 31 in a direction perpendicular to the paper. The common electrode 9 is composed of a data line and has a striped shape intersecting with the scanning line 13. In the present exemplary embodiment, a region in which a pixel electrode 31 is formed is a dot region, and a TFD element 40 is provided in each of the dot regions arranged in a matrix, thereby enabling each dot region to perform display.

The TFD element 40 is a switching element to connect the scanning line 13 to the pixel electrode 31, and has an MIM structure in which a first conductive film whose main ingredient is Ta is formed, an insulating film whose main ingredient is $Ta_2O_3$ is formed on the surface of the first conductive film, and a second conductive film whose main ingredient is Cr is formed on the surface of the insulating film. The first conductive film of the TFD element 40 is connected to the scanning line 13, and the second conductive film thereof is connected to the pixel electrode 31.

Figure 3:
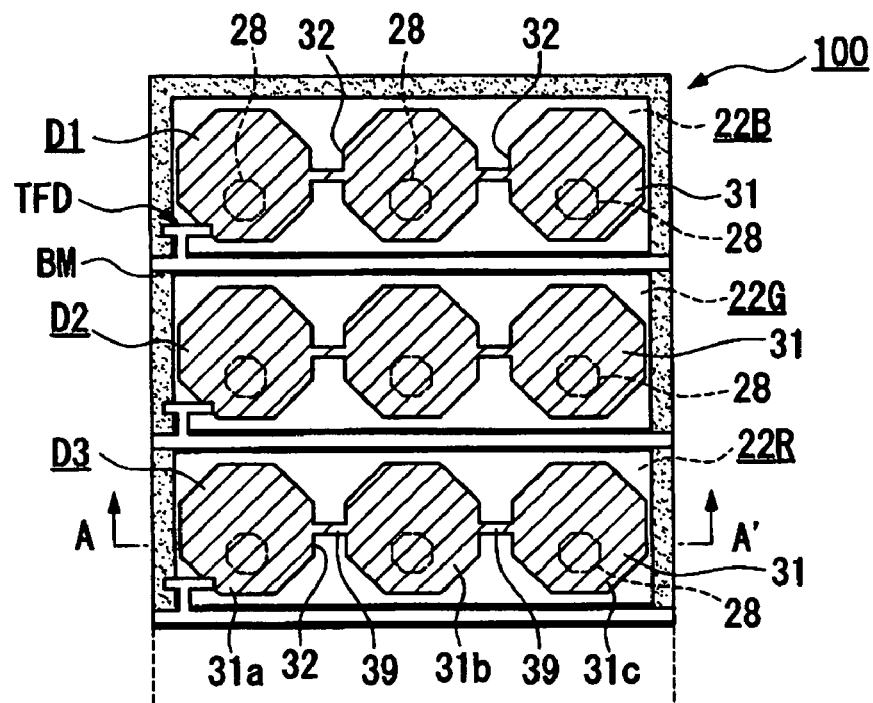
FIGS. 3(a) and 3(b) are a plan view and a cross-sectional view schematically illustrating a significant part of the liquid crystal display device according to the first exemplary embodiment of the present invention.
Figure 3:
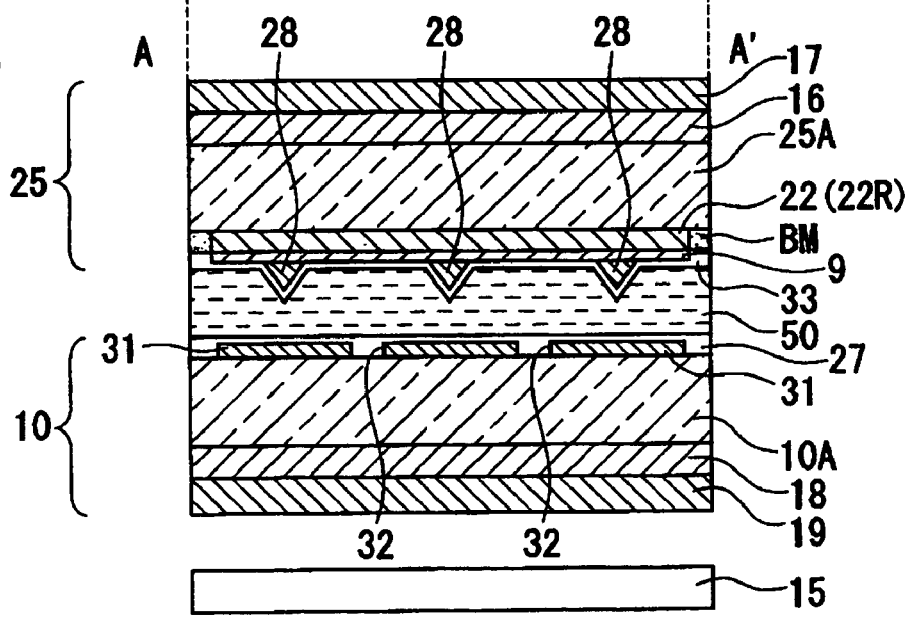

The pixel structure of the liquid crystal display device 100 according to the present exemplary embodiment is described below with reference to FIGS. 3(a) and 3(b). FIG. 3(a) is a schematic showing the pixel structure of the liquid crystal display device 100, and more particularly, showing the planar structure of the pixel electrode 31. FIG. 3(b) is a schematic cross-sectional view taken along plane A-A' of FIG. 3(a). In the liquid crystal display device 100 of the present exemplary embodiment, as shown in FIG. 2, dot regions, each having the pixel electrode 31, are formed in the vicinities of regions in which the data lines 9 and the scanning lines 13 intersect with each other. As shown in FIG. 3(a), a colored layer having one of the three primary colors is provided corresponding to one dot region, and pixels having colored layers 22B (blue), 22G (green), and 22R (red) are formed in the three dot regions (D1, D2, and D3), respectively.

As shown in FIG. 3(b), in the liquid crystal display device 100 of the present exemplary embodiment, a liquid crystal layer 50 composed of liquid crystal having a vertical alignment in an initial state, that is, having negative dielectric anisotropy, is interposed between a lower substrate (an element substrate) 10 and an upper substrate (a counter substrate) 25 opposite to the lower substrate 10. In addition, a chiral agent may be added to a liquid crystal material in order to enhance transmittance.

In the lower substrate 10, the pixel electrodes 31 made of indium tin oxide (hereinafter "ITO") are formed on the surface of a substrate body 10A made of a transmissive material, such as quartz or glass, and an alignment film 27 made of polyimide is formed on the pixel electrodes 31. The alignment film 27 functions as a vertical alignment film that allows liquid crystal molecules to be vertically aligned with respect to the surface thereof, and is not subjected to an alignment process, such as a rubbing process.

As shown in FIG. 3(a), each pixel electrode 31 includes a plurality (three in the present embodiment) of island-shaped portions 31a, 31b, and 31c in one dot region (for example, a dot region D3), and the respective island-shaped portions 31a, 31b, and 31c are electrically connected to each other by connecting portions 39. That is, in the present exemplary embodiment, the pixel electrode 31 formed on the lower substrate 10 includes the plurality of island-shaped portions 31a, 31b, and 31c and the connecting portions 39 to electrically connect adjacent island-shaped portions to each other, and the island-shaped portions 31a, 31b, and 31c each constitute a sub-dot region.

As such, the dot regions D1, D2, and D3 each include a plurality of sub-dot regions, each having substantially the same shape (a similar shape), and each of the sub-dot regions (the island-shaped portions 31a, 31b, and 31c) has the shape of a regular octagon as shown in FIG. 3(a). However, the shape of the sub-dot region is limited thereto, and may be, for example, a circle or a polygon, and preferably, a regular polygon. That is, the sub-dot region can be formed in a shape that is in point symmetry or substantially in point symmetry with respect to its center. In addition, the number of sub-dot regions in one dot region is not limited to three. From the viewpoint of a response speed and transmittance, the sub-dot region has an enhanced or the optimum size, for example, a diameter of 40 µm to 50 µm. Therefore, it is preferable that two to twelve sub-dot regions be formed in one dot region because of the size limit of a dot region.

Further, a slit 32 (a portion other than the connecting portions 39) is formed between the island-shaped portions 31a, 31b, and 31c by partially cutting off the pixel electrode 31. By forming the slit 32, an inclined electric field can be generated between the electrodes 9 and 31 in the region in which the slit 32 is formed. As a result, the alignment direction of the liquid crystal molecules that are vertically aligned in an initial state are regulated by the inclined electric filed generated when a voltage is applied.

Furthermore, in the upper substrate 25, a color filter 22 (only a red colored layer 22R is shown in FIG. 3(b)) is provided on an inner surface of a substrate body 25A (a surface of the substrate body 25A facing the liquid crystal layer) made of transmissive material, such as quartz or glass. Herein, the edge of the colored layer 22R is surrounded with a black matrix BM made of a metallic material, such as chrome, and the boundaries between the respective dot regions D1, D2, and D3 are defined by the black matrix BM (see FIG. 3(a)).

Moreover, a striped-shaped common electrode 9 made of indium tin oxide (hereinafter "ITO") is formed on the inner surface of the color filter 22. In addition, the common electrode 9 is formed in a stripe shape extending in a direction perpendicular to the paper in FIG. 3(b), and is common to the respective dot regions formed parallel to the direction perpendicular to the paper.

Further, convex portions 28 are formed on the inner surface of the common electrode 9 so as to protrude from the inner surface of the common electrode 9 (the lower substrate 25) toward the liquid crystal layer 50, and an alignment film 33 is formed to cover the convex portions 28 and the inner surface of the common electrode 9. The alignment film 33 functions as a vertical alignment film to allow the liquid crystal molecules to be vertically aligned with respect to the surface thereof, and is not subjected to an alignment process, such as a rubbing process.

Herein, the convex portions 28 are made of a transmissive dielectric, such as acrylic resin, and function to give convex shapes from the inner surface of the upper substrate 25 to the liquid crystal layer 50. Specifically, each of the convex portions 28 protrudes from the common electrode 9 toward the liquid crystal layer 50 with a predetermined height (for example, a height of 0.05 µm to 1.5 µm). In more detail, the convex portion 28 is formed of a projection having the shape of a regular octagonal prism having incline planes that are inclined at a predetermined angle with regard to the inner surface of the common electrode 9, and the incline plane has the maximum inclination angle of 2° to 20°. In this case, the inclination angle is an angle formed between the incline plane of the convex portion 28 and the inner surface of the common electrode 9. In addition, when the convex portion has a curved surface, the inclination angle indicates an angle formed between the inner surface of the common electrode 9 and a surface tangent to the curved surface of the convex portion. The shape of the convex portion 28 is not limited to a regular octagonal prism, and may be, for example, a cone, a truncated cone, a truncated polygonal prism, or a hemisphere.

Further, the convex portion 28 is arranged in each sub-dot region (the island-shaped portion 31a, 31b, or 31c), and thus the alignment division of liquid crystal molecules is pre-formed on every sub-dot region. The convex portion 28 has a regular octagonal shape in plan view as shown in FIG. 3(a). That is, the shape of convex portion 28 is similar to or substantially similar to the shape of the sub-dot region (the island-shaped portion 31a, 31b, or 31c) in plan view. Therefore, in the plan view of the convex portion 28, the convex portion 28 is arranged such that its each side is parallel to or substantially parallel to each side of the sub-dot region. The planar shape of convex portion 28 is not limited to a regular octagon, and may be a circle or a polygon, and preferably, a regular polygon. That is, the convex portion 28 has a shape that is in point symmetry or substantially in point symmetry with respect to its center.

Figure 6:
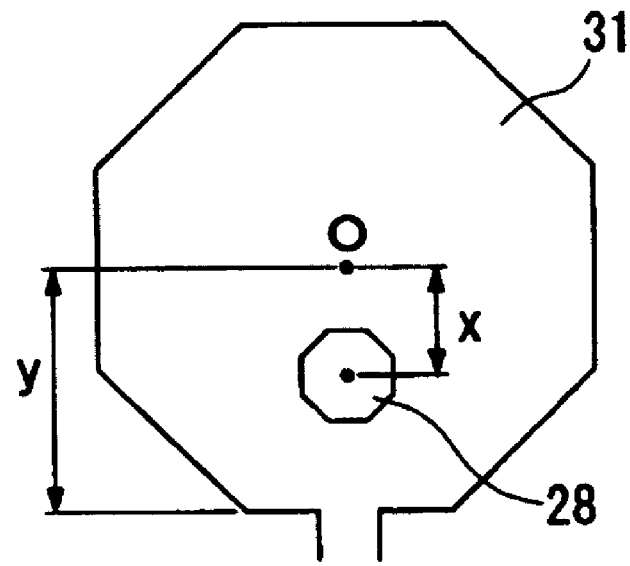
FIG. 6 is a schematic illustrating a state in which a convex portion is eccentrically arranged in the liquid crystal display device according to the first exemplary embodiment of the present invention.

Furthermore, the convex portion 28 is eccentrically arranged such that its center deviates from the center of the sub-dot region (the island-shaped portion 31a, 31b, or 31c) to which the convex portion 28 itself belongs. Specifically, as shown in FIG. 6, the center of the convex portion 28 is positioned apart from the center O of the sub-dot region by a distance x. Herein, when the distance from the center O of the sub-dot region to the outer circumference thereof via the center of the convex portion 28 is "y", the distance x satisfies the condition 0.05 y ≦ x ≦ 0.7 y (in the present exemplary embodiment, x=0.3 y). In addition, each convex portion 28 is located at positions leaning in the 6 o'clock direction from the center O of each sub-dot region in the display screen.

With the convex portions 28 having the above-mentioned structure, it is possible to regulate the alignment direction of the liquid crystal molecules having a vertical alignment in an initial state along the incline planes of the convex portions 28 when a voltage is applied. In addition, the convex portion 28 is arranged between the electrode slits 32 formed in the lower substrate 10 in plan view. That is, the convex portion 28 and the electrode slit 32 are located at different positions in one dot region.

Next, as shown in FIGS. 3(a) and 3(b), a retardation plate 18 and a polarizing plate 19 are sequentially formed on the outer surface (a surface opposite to the liquid crystal layer 50) of the lower substrate 10, and a retardation plate 16 and a polarizing plate 17 are sequentially formed on the outer surface of the upper substrate 25. Therefore, circularly polarized light can be incident on the inner surface (a surface facing the liquid crystal layer 50) of the substrate. In addition, a combination of the retardation plate 18 and the polarizing plate 19, and a combination of the retardation plate 16 and the polarizing plate 17 constitute circularly polarizing plates, respectively. The polarizing plate 17 (19) transmits only the linearly polarized light components each having a polarizing axis in a predetermined direction, and a λ/4 retardation plate is employed as the retardation plate 16 (18). A combination (a broadband circular polarizing plate) of the polarizing plate, a λ/2 retardation plate and a λ/4 retardation plate can also be used as the circularly polarizing plate. In this case, it is possible to perform black display rich in an achromatic color. In addition, it is possible to use a structure in which the polarizing plate, the λ/2 retardation plate, the λ/4 retardation plate, and a plate (a retardation plate having an optical axis in the thickness direction thereof) are combined. A backlight 15, which is a light source for transmissive display, is provided on the outside of the polarizing plate 19 formed on the lower substrate 10.

In the liquid crystal display device 100 according to the present exemplary embodiment, the convex portions 28 are formed on the inner surface (the surface facing the liquid crystal layer 50) of the upper substrate 25, and the electrode slits 32 are formed in the inner surface (the surface facing the liquid crystal layer 50) of the lower substrate 10, in order to regulate the alignment of the liquid crystal molecules in the liquid crystal layer 50, that is, in order to regulate the direction in which the liquid crystal molecules, each having a vertical alignment in an initial state are inclined when a voltage is applied between the electrodes. In other words, the convex portion 28 regulates the inclined direction of the liquid crystal molecules along its incline surface, and the slit 32 regulates the inclined direction of the liquid crystal molecules using an inclined electric field generated between the slit 32 itself and the electrode opposite thereto. In addition, the convex portions 28 formed on the common electrode 9 and the slits 32 formed in the pixel electrode 31 are arranged so as to alternate with each other in plan view. Therefore, it is possible to align the liquid crystal molecules in the same direction between the convex portions 28 and the slits 32.

In the liquid crystal display device 100 according to the present exemplary embodiment, each convex portion 28 has a substantially symmetric longitudinal section to radially incline the liquid crystal molecules from the circumference thereof in the sub-dot region to which the convex portion itself belongs. That is, each convex potion 28 has a substantially symmetric longitudinal section such that the liquid crystal molecules can be inclined in all directions when a voltage is applied, and functions as an alignment regulating device having a shape that is in point symmetry with respect to its center. In order to align the liquid crystal molecules substantially in a radial direction in each sub-dot region, it may be preferable that dielectric projections, such as the convex portions 28, be formed on the inner surface of the substrate, and that the electrode slits having the same planar shape as the convex portions 28 be also formed. In other words, by forming an opening having a regular polygonal shape or a circular shape in each sub-dot region (31a, 31b, and 31c) in the pixel electrode 31, it is also possible to radially incline the liquid crystal molecules around the opening.

Further, in the present exemplary embodiment, since convex portion 28, which is an alignment regulating device, is eccentrically arranged such that its center deviates from the center O of the sub-dot region, high transmittance can be obtained at a specific viewing angle. That is, in the present exemplary embodiment, the convex portion 28 is arranged at a position leaning in the 6 o'clock direction from the center O of the sub-dot region in the display screen such that the expression x=0.3 y (see FIG. 6) is satisfied. Therefore, the peak of the transmittance is observed at a position leaning in the 12 o'clock direction in the display screen.

Figure 8:
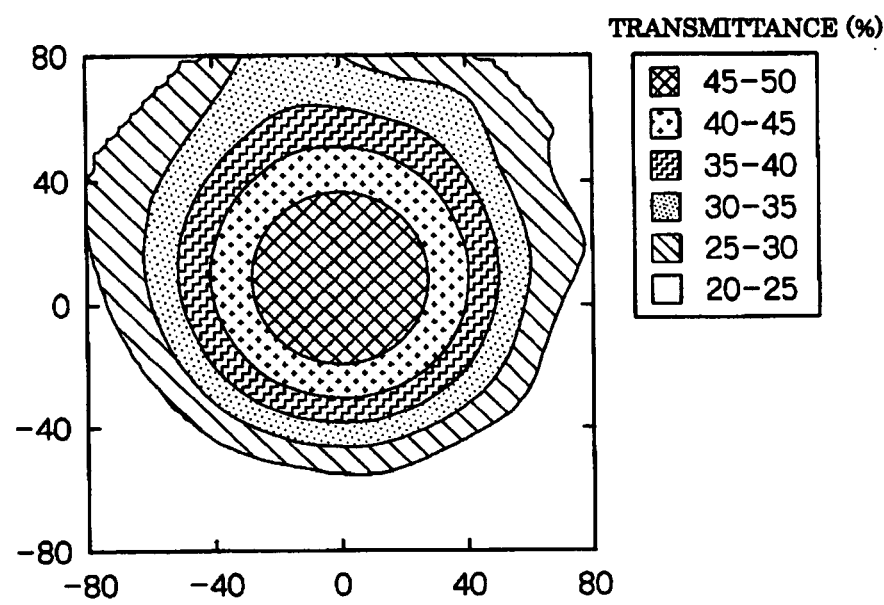
FIG. 8 is a schematic illustrating the viewing angle dependence of transmittance in the liquid crystal display device according to the first exemplary embodiment.

FIG. 8 is a schematic view illustrating the viewing angle dependence of transmittance in the liquid crystal display device 100 of the present exemplary embodiment, and shows the range in which transmittance is the same with respect to each polar angle (an inclination angel in the normal direction of a panel). As such, the peak of transmittance shifts from the front to the 12 o'clock direction, and thus the transmittance from the 10 o'clock direction to the 2 o'clock direction becomes high with the 12 o'clock direction as the center. That is because relatively many liquid crystal molecules are inclined parallel to light components emitted from a backlight 15 to a display screen in the 6 o'clock direction, by radially inclining the liquid crystal molecules with the convex portion 28 as the center and by eccentrically arranging the convex portion 28 in the 6 o'clock direction.

Further, when the pixel electrodes each having an island-shaped portion are provided on the upper substrate 25 and the striped-shaped common electrode having the convex portions is provided on the lower substrate 10, it is also possible to increase the transmittance in the specific direction of a viewing angle by eccentrically arranging the convex portions. In this case, when the convex portions formed on the lower substrate 10 are eccentrically arranged in the 12 o'clock direction, the peak of transmittance shifts to the 12 o'clock direction. That is because the inclined direction of liquid crystal molecules depends on which of the upper substrate 25 and the lower substrate 10 the convex portions are formed.

Figure 9:
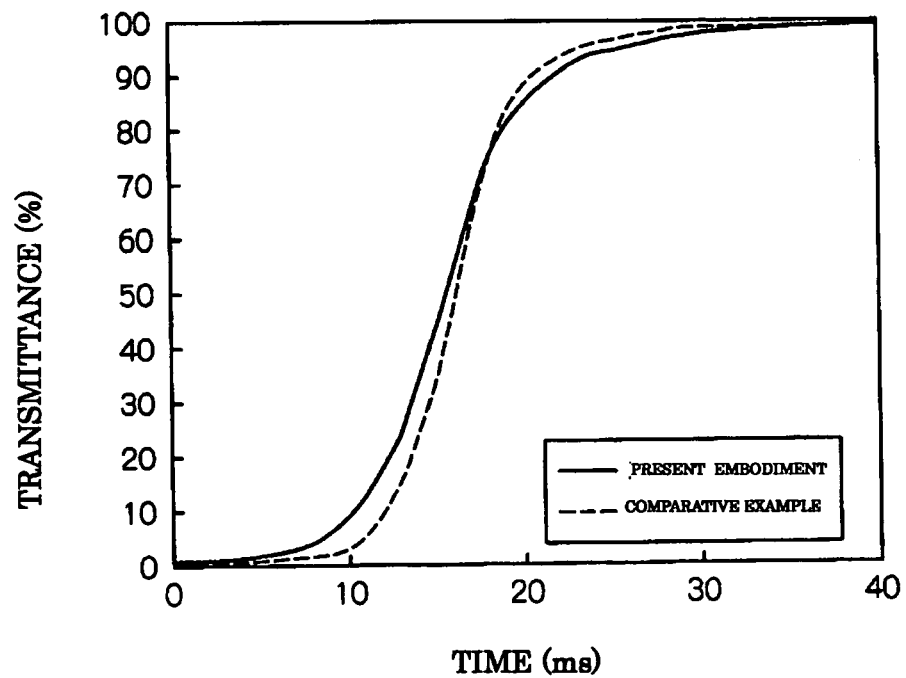
FIG. 9 is a graph illustrating the difference in a response speed between the liquid crystal display device of the first exemplary embodiment and a liquid crystal display device of a comparative example.

Furthermore, in the present exemplary embodiment, since the convex portions 28 are eccentrically arranged, the response speed is fast in a region in which the distance between the convex portion 28 and the edge (the edge of the island-shaped portion 31a, 31b, or 31c) of the pixel electrode 31 is small. On the contrary, the response speed is slow in a region in which the distance therebetween is large. That is because the vertically aligned liquid crystal molecules are sequentially operated with the convex portion 28 as a starting point. Therefore, if measuring the response speed of the liquid crystal display device 100 according to the present exemplary embodiment, the results shown in FIG. 9 are obtained. FIG. 9 is a graph illustrating the relationship between time and transmittance. In FIG. 9, the result obtained in the liquid crystal display device of the present exemplary embodiment in which the convex portions 28 are eccentrically arranged is indicated by a solid line, and the result obtained in a liquid crystal display device of a comparative example in which the convex portions are not arranged eccentrically, but are arranged at the centers of sub-dot regions is indicated by a dotted line.

As shown in FIG. 9, in a dot region having transmittance in the range of 0% to 90%, the response speed of the liquid crystal display device of the present exemplary embodiment is more delayed than that of the comparative example in which the convex portions are arranged at the centers of the sub-dot regions, and the response speed is faster than that of the comparative example in a dot region having transmittance in the range of 0% to 60%. That is, by eccentrically arranging the convex portions, which are alignment regulating devices, it is possible to make the response speed fast in a transmittance range of 0% to about 60% (an intermediate value), which is considerably advantageous in displaying a moving picture, that is, which enables an object moving at a high speed to be displayed with high contrast.

The liquid crystal display device 100 of the present exemplary embodiment having a fast response speed and a viewing angle characteristic in which transmittance is high in the 12 o'clock direction is a display device suitable for a navigation system or a personal computer. Such a display device mainly displays a moving picture, and a display device for a navigation system is mainly viewed in the 2 o'clock direction (a driver's seat) and the 10 o'clock direction (the seat next to the driver). In addition, a display device for a personal computer is mainly viewed from the front side, that is, the display device is mainly viewed in the 10 o'clock direction, the 12 o'clock direction, or the 2 o'clock direction, but is hardly viewed in the 6 o'clock direction. Therefore, the liquid crystal display device 100 of the present exemplary embodiment is preferably adopted.

[Second Exemplary Embodiment]

A second exemplary embodiment of the present invention is described below with reference to the drawings.

Figure 4:
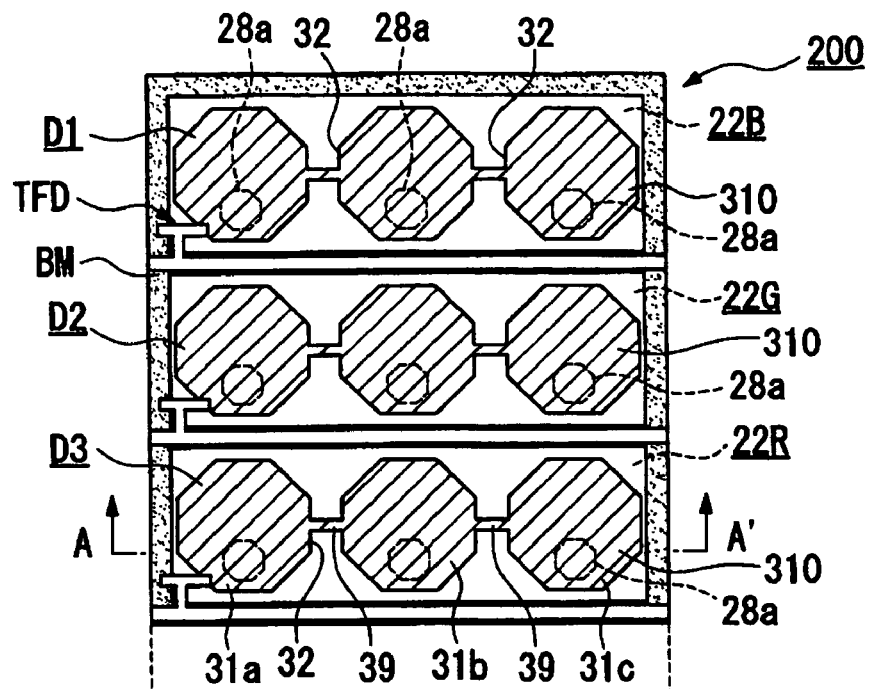
FIGS. 4(a) and 4(b) are a plan view and a cross-sectional view schematically illustrating a significant part of a liquid crystal display device according to a second exemplary embodiment of the present invention.
Figure 4:
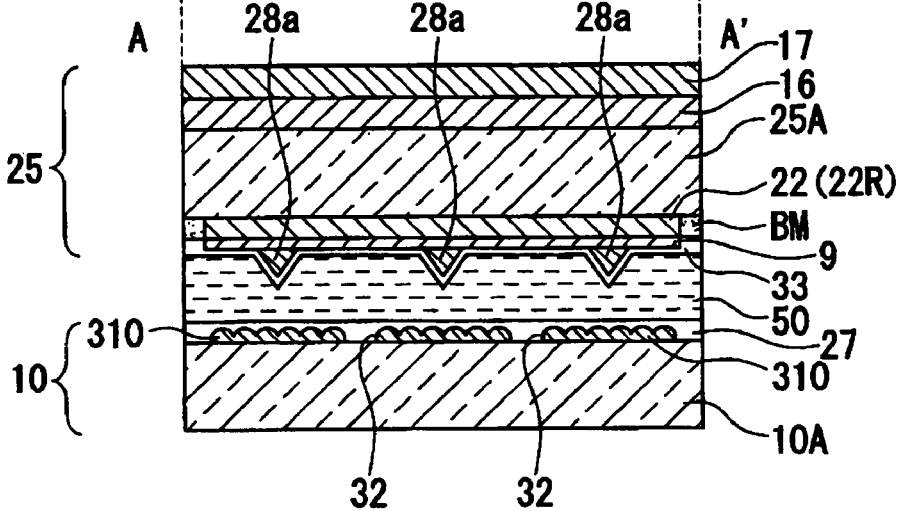

FIGS. 4(a) and 4(b) are a plan view and a cross-sectional view schematically illustrating a liquid crystal display device according to the second exemplary embodiment, and correspond to FIGS. 3(a) and 3(b) of the first exemplary embodiment. The basic structure of the liquid crystal display device according to the second exemplary embodiment is the same as that of the first exemplary embodiment, but the second exemplary embodiment is different from the first exemplary embodiment in that pixel electrodes are composed of a reflective film. In FIGS. 4(a) and 4(b), the same components as those in FIGS. 3(a) and 3(b) have the same reference numerals, and a detailed description thereof will be omitted.

As shown in FIGS. 4(a) and 4(b), a liquid crystal display device 200 of the second exemplary embodiment is a reflective liquid crystal display device in which pixel electrodes 310 formed on the inner surface of the lower substrate 10 are composed of a reflective film made of a metallic material, such as aluminum, and the surface of the pixel electrode has an uneven shape. Since the uneven shape causes reflected light to be scattered, the reflection of external light is reduced or prevented. In addition, a retardation plate, a polarizing plate, and a backlight are not formed on the outer surface (a surface opposite to the liquid crystal layer 50) of the lower substrate 10 because a reflective liquid crystal display device is adopted.

Figure 7:
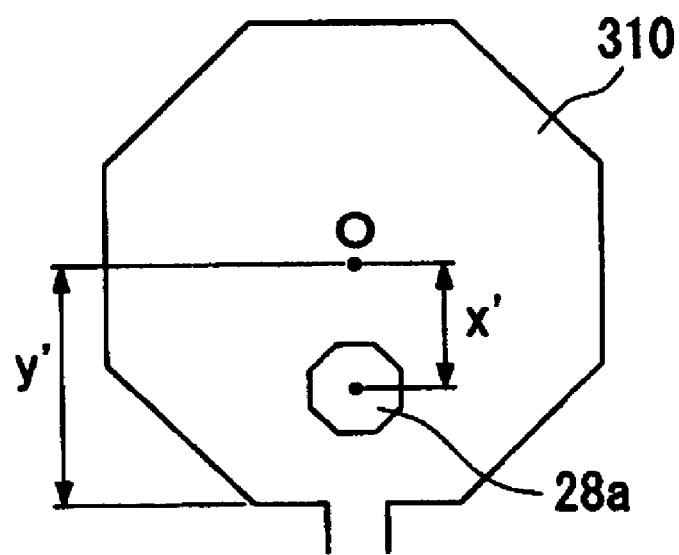
FIG. 7 is a schematic illustrating a state in which the convex portion is eccentrically arranged in the liquid crystal display device according to the second exemplary embodiment of the present invention.

Further, similar to the first exemplary embodiment, the convex portions 28a made of a dielectric material are formed on the inner surface of the common electrode 9 that is provided on the inner surface of the upper substrate 25. As shown in FIGS. 4(a) and 7, each convex portion 28a of the present exemplary embodiment is arranged in the sub-dot regions so as to deviate from the center O of each sub-dot region. In addition, when the distance from the center O of the sub-dot region to the outer circumference thereof via the center of the convex portion 28a is "y'", the distance x' between the center O of the sub-dot region and the center of the convex portion 28a satisfies the condition $0.5\ y' \leq x' \leq 0.7\ y'$ (in the present exemplary embodiment, x'=0.5 y'). In addition, each convex portion 28a is located at a position leaning in the 6 o'clock direction from the center O of each sub-dot region in the display screen.

In the liquid crystal display device 200 of the second exemplary embodiment, since the convex portions 28a, which are an alignment regulating device, are arranged such that their centers deviate from the centers of the sub-dot regions, it is possible to obtain a display characteristic in which reflectance is high in a specific viewing angle direction. Particularly, since the convex portion 28a is eccentrically arranged in the 6 o'clock direction, the peak of transmittance shifts to the 12 o'clock direction, and thus high transmittance is obtained in the direction from 10 o'clock to 2 o'clock with the 12 o'clock direction as the center.

Furthermore, since the liquid crystal display device 200 of the present exemplary embodiment is a reflective type, the alignment of liquid crystal molecules has an effect on a viewing angle characteristic both when light is incident thereon and when light exits therefrom. Therefore, the distance between the center of the sub-dot region and the center of the convex portion 28a is as large as possible. In addition, when the eccentric distance x' is less than 0.5 y', a position in which the maximum brightness (the ratio of emission light to incident light) is obtained deviates from the front, resulting in the impossibility of recognition.

[Third Exemplary Embodiment]

A third exemplary embodiment of the present invention is described below with reference to the drawings.

Figure 5:
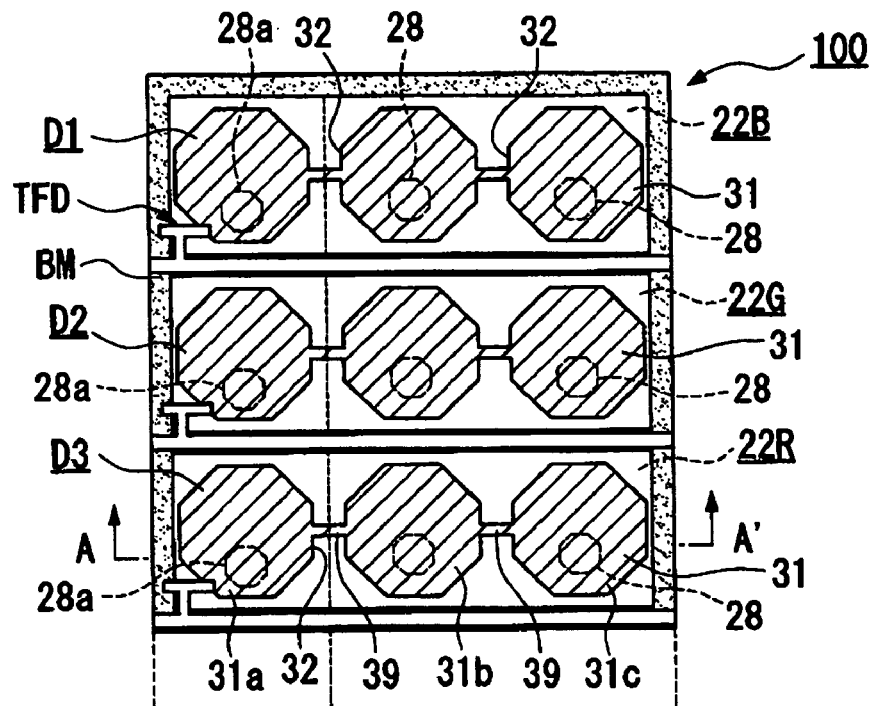
FIGS. 5(a) and 5(b) are a plan view and a cross-sectional view schematically illustrating a significant part of a liquid crystal display device according to a third exemplary embodiment of the present invention.
Figure 5:
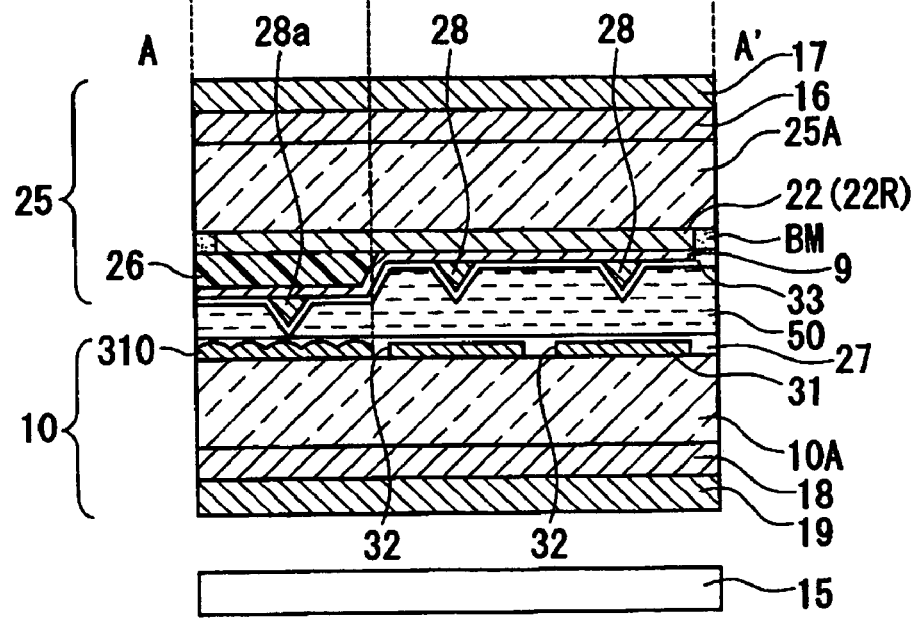

FIGS. 5(a) and 5(b) are a plan view and a cross-sectional view schematically illustrating a liquid crystal display device according to the third exemplary embodiment, and correspond to FIGS. 3(a) and 3(b) of the first exemplary embodiment. The basic structure of the liquid crystal display device according to the third exemplary embodiment is the same as that of the first embodiment, but the third exemplary embodiment is mainly different from the first embodiment in that pixel electrodes are composed of a reflective film. In FIGS. 5(a) and 5(b), the same components as those in FIGS. 3(a) and 3(b) have the same reference numerals, and a detailed description thereof will be omitted.

As shown in FIGS. 5(a) and 5(b), a liquid crystal display device 300 of the third exemplary embodiment is a transflective liquid crystal display device in which each pixel electrode formed on the inner surface of the lower substrate 10 includes a reflective film made of a metallic material, such as aluminum 310, and a transparent electrode film 32 made of ITO. The metal reflective film 310 and the transparent electrode film 32 each form an island-shaped portion constituting a sub-dot region. Specifically, the metal reflective film 310 constitutes an island-shaped portion 31a, and the transparent electrode film 32 constitutes island-shaped portions 31b and 31c. Then, the metal reflective film 310 and the transparent electrodes 31 are connected to each other by connecting portions 39. When the metal reflective film and the transparent electrode are respectively made of two materials, such as aluminum and ITO, between which the difference in a work function is large, the electromotive force generated therebetween has an adverse effect on display characteristics and reliability of a display device. Therefore, it may be preferable to form the transparent electrode film so as to cover the entire surface of the metal reflective film. In addition, since the surface of the metal reflective film 310 is formed in an uneven shape to scatter reflected light, light reflection from the outside is reduced or prevented. Herein, a region in which the metal reflective film 310 is formed is a reflective display region R, and a region in which the transparent electrode film 31 is formed is a transmissive display region T.

Further, an insulating film 26 is selectively formed on the inner surface of the color filter 22 formed on the inner surface of the upper substrate 25 at positions corresponding to the reflective display region R. That is, the insulting film 26 is selectively formed so as to be located above the reflective film 310, and the thickness of liquid crystal layer 50 in the reflective display region R is different from the thickness of the liquid crystal layer 50 in the transmissive display region T due to the insulating film 26. The insulating film 26 is composed of an organic film made of acrylic resin that has a thickness of 0.5 µm to 2.5 µm, and has an incline plane whose thickness is continuously changed in the vicinity of the boundary between the reflective display region R and the transmissive display region T. The thickness of the liquid crystal layer 50 in a region in which the insulating film 26 does not exist is in the range of 2 µm to 5 µm, and the thickness of the liquid crystal layer 50 in the reflective display region R is about half the thickness of the liquid crystal layer 50 in the transmissive display region T. As such, the insulating film 26 functions as a layer to adjust the thickness of the liquid crystal layer (a layer to control the thickness of the liquid crystal layer) that makes the thickness of the liquid crystal layer 50 in the reflective display region R different from the thickness of the liquid crystal layer 50 in the transmissive display region T. That is, the thickness of the liquid crystal layer 50 in the reflective display region R can be half the thickness of the liquid crystal layer 50 in the transmissive display region T by providing the insulating film 26. Therefore, it is possible to make retardation contributed to reflective display substantially equal to retardation contributed to transmissive display, thereby enhancing contrast.

Furthermore, the common electrode 9 is formed on the inner surface of the color filter 22 including the insulting film 26, and convex portions 28$a$ and 28, which are the alignment regulating devices, are formed on the inner surface of the common electrode 9. Each of the convex portions 28$a$ and 28 is arranged such that its center deviates from the center of the sub-dot region, and the eccentric position (the distance from the center of the dot region) of the convex portion 28$a$ in the reflective display region R is different from that of the convex portion 28 in the transmissive display region T.

Specifically, as shown in FIG. 6, the distance x between the center of the sub-dot region and the center of the convex portion 28 arranged in the transmissive display region T satisfies the condition 0.05 y$\leq$x$\leq$0.7 y (in the present exemplary embodiment, x=0.3 y), and the distance x' between the center of the sub-dot region and the center of the convex portion 28$a$ arranged in the reflective display region R satisfies the condition 0.5 y'$\leq$x'<0.7 y' (in the present exemplary embodiment, x'=0.5 y'). In addition, y=y' in the present exemplary embodiment. Each of the convex portions 28 and 28$a$ is arranged at a position leaning in the 6 o'clock direction from the center O of each sub-dot region in the display screen.

In the liquid crystal display device 300 of the third exemplary embodiment, since each of the convex portions 28 and 28$a$, which are the alignment regulating devices, is eccentrically arranged so as to deviate from the center O of the sub-dot region, it is possible to obtain a display characteristic in which reflectance or transmittance is high in a specific viewing angle direction. Particularly, since the convex portions 28 and 28$a$ lean in the 6 o'clock direction from the centers of the sub-dot regions, the peak of transmittance shifts to the 12 o'clock direction, and thus high transmittance is obtained in the direction from 10 o'clock to 2 o'clock with the 12 o'clock direction as the center.

Since the liquid crystal display device 300 of the present exemplary embodiment is a transflective type, the distance between the center of the sub-dot region (the island-shaped portion 31$a$) and the center of the convex portion 28$a$ in the reflective display region is different from the distance between the center of the sub-dot region (the island-shaped portion 31$b$ or 31$c$) and the center of the convex portion 28 in the transmissive display region. That is, in the sub-dot region for transmissive display, the light emitted from a backlight 15 passes through the liquid crystal layer 50 once, while the light incident through the outer surface of the upper substrate 25 passes through the liquid crystal layer 50 twice. Therefore, as described above, by making the distance between the center of the sub-dot region and the center of the convex portion 28$a$ in the reflective display region R different from the distance between the center of the sub-dot region and the center of the convex portion 28 in the transmissive display region T, it is possible to make the inclination angle of the liquid crystal molecules in the reflective display region different from that in the transmissive display angle. For example, in the reflective display region, transmittance can have a peak value in the 12 o'clock direction in order to effectively use the light illuminated from the upper direction of an observer, and in the transmissive display region, transmittance can have a peak value in the front (in the normal direction of a panel).

In the liquid crystal display devices according to the first to third exemplary embodiments, it is possible to arrange the convex portions such that the directions in which the convex portions are separated from the centers of the sub-dot regions are different from each other in the respective sub-dot regions. In this case, the respective sub-dot regions have different viewing angle characteristics. For example, it is possible to provide a liquid crystal display device in which high emittance is obtained in both the 3 o'clock direction and the 9 o'clock direction.

[EXAMPLE]

Figure 10:
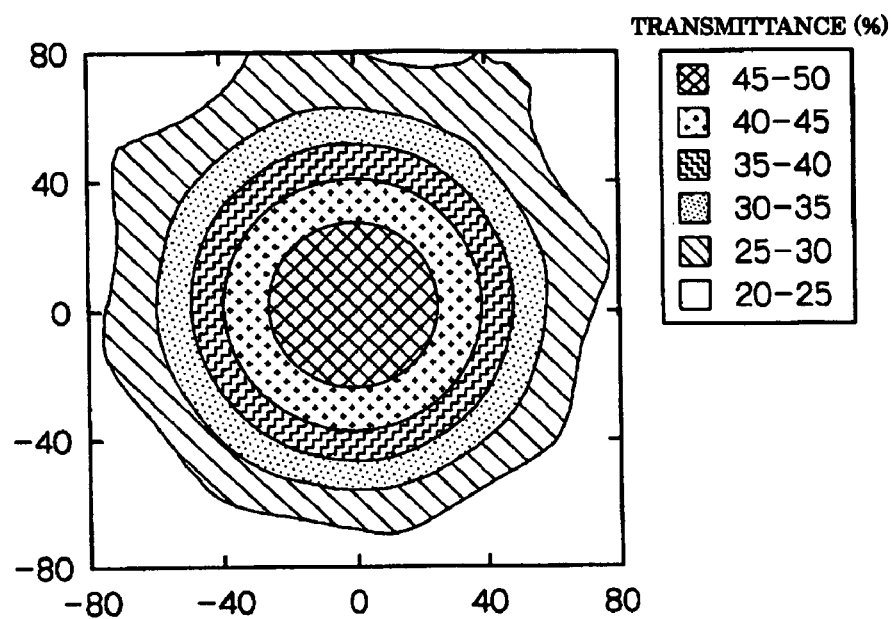
FIG. 10 is a schematic illustrating the viewing angle dependence of transmittance in an example in which the eccentric distance of the convex portion is changed.
Figure 11:
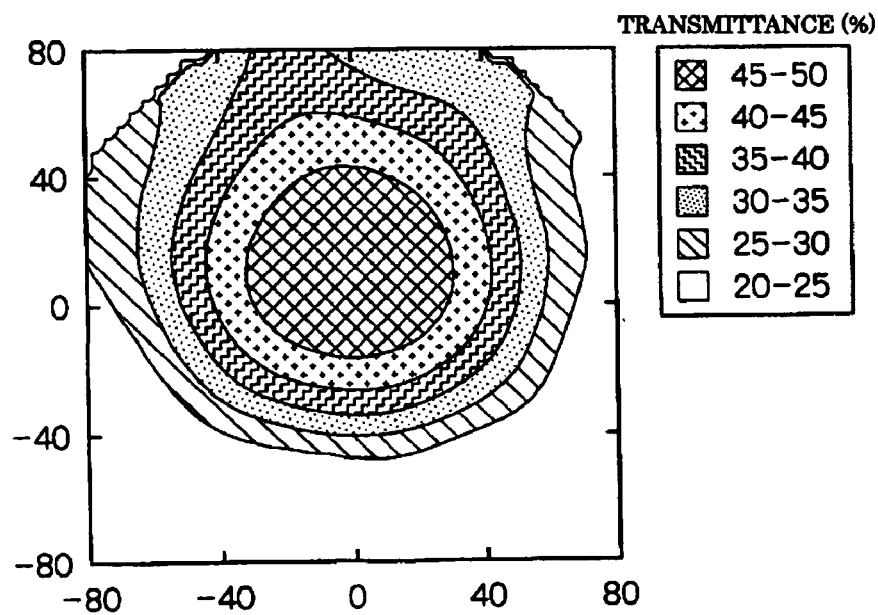
FIG. 11 is a schematic illustrating the viewing angle dependence of transmittance in another example in which the eccentric distance of the convex portion is changed.
Figure 12:
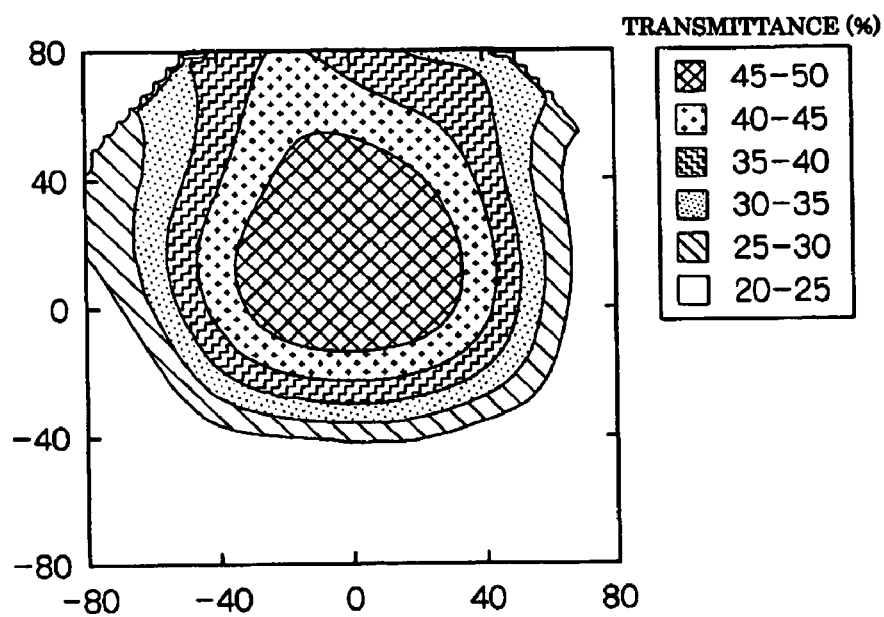
FIG. 12 is a schematic illustrating the viewing angle dependence of transmittance in still another example in which the eccentric distance of the convex portion is changed.

It is examined that the viewing angel dependence of transmittance is changed in the liquid crystal display device 100 of the first exemplary embodiment when a few convex portions 28 are formed at different eccentric positions. FIGS. 10 to 12 illustrate the results of the examination, and are schematics showing the viewing angle dependence of transmittance, similar to FIG. 8 illustrating the examination results of the first embodiment. FIG. 10 shows the viewing angle dependence of transmittance when the distance x between the center of the sub-dot region and the center of the convex portion 28 is 0.05 y. FIG. 11 shows the viewing angle dependence of transmittance when the distance x therebetween is 0.5 y. FIG. 12 shows the viewing angle dependence of transmittance when the distance x therebetween is 0.7 y.

As shown in FIG. 10, when the eccentric distance is small, a viewing angle and a response speed are not enhanced very much. Particularly, under the condition of x<0.05 y, the deviation of the peak of transmittance from the front may be not recognized.

On the other side, as shown in FIGS. 11 and 12, when the eccentric distance is large, the deviation of the peak of transmittance from the front may be apparently recognized. In this case, there is a strong possibility that the alignment disorder of liquid crystal molecules will be generated in a region positioned in a direction opposite to the eccentric direction of the convex portion 28 with respect to the center of the sub-dot region. However, since strong alignment regulating force acts on not only the liquid crystal molecules in a region in which the convex portion 28 is eccentrically provided in one sub-dot region, but also the liquid crystal molecules in the region positioned in the direction opposite to the eccentric direction of the convex portion 28 in the sub-dot region, the liquid crystal molecules in both the regions are normally aligned. Therefore, even when the distance between the center of the sub-dot region and the center of the convex portion 28 is relatively large, the alignment disorder of the liquid crystal molecules is hardly generated.

However, when the region positioned in the eccentric direction in the sub-dot region is small due to the extremely large distance between the center of the sub-dot region and the center of the convex portion, the liquid crystal molecules are not normally aligned in the entire sub-dot region. As a result, the alignment disorder of liquid crystal molecules can be easily generated by insignificant factors, such as the existence of spacers or dust in the liquid crystal layer 50, a variation of temperature, and electric potential caused by adjacent pixels. Particularly, when the distance x is more than 0.7 y, the alignment disorder of the liquid crystal molecules can be more easily generated.

In view of the results so far achieved, it may be preferable that the distance x between the center of the sub-dot region and the center of the convex portion 28, which is the alignment regulating device, satisfy the condition $0.05 y \leq x \leq 0.7 y$.

Figure 13:
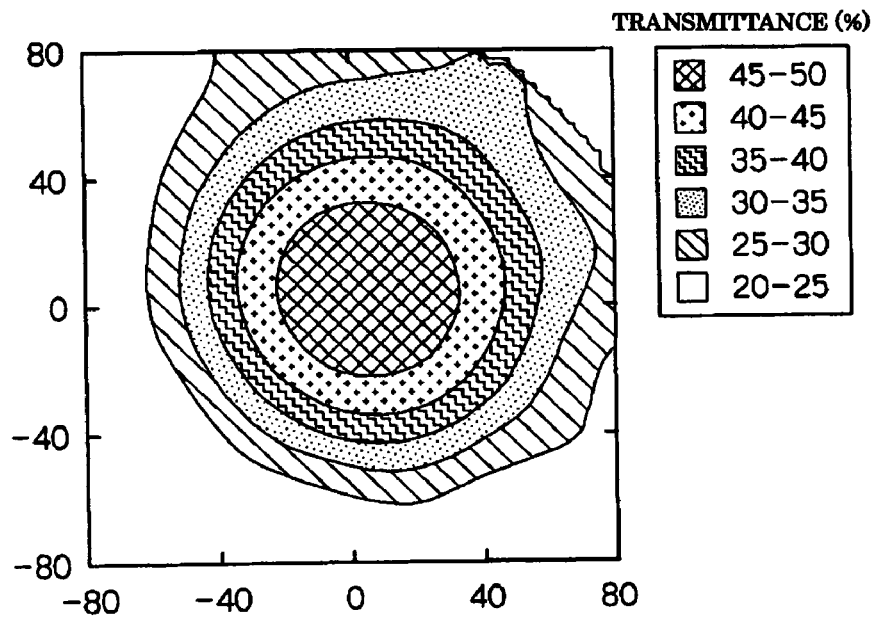
FIG. 13 is a schematic illustrating the viewing angle dependence of transmittance in an example in which the eccentric direction of the convex portion is changed.

In the first exemplary embodiment, the separation direction (the eccentric direction) of the convex portion 28 from the center of the sub-dot region is the 6 o'clock direction. However, the examination of the viewing angle dependence of transmittance is performed on a case in which the separation direction (the eccentric direction) is changed to the 8 o'clock direction. FIG. 13 is a schematic illustrating the results of the examination. As shown in FIG. 13, when the separation direction (the eccentric direction) of the convex portion 28 is the 8 o'clock direction, the peak of transmittance shifts to the 2 o'clock direction. As a result, high transmittance is generated from the 12 o'clock direction to the 4 o'clock direction with the 2 o'clock direction as the center. The liquid crystal display device having such a viewing angle characteristic is suitable for a display device for a navigation system that is mainly viewed from the 2 o'clock direction (a driver's seat).

[Exemplary Electronic Apparatus]

A specific example of an electronic apparatus equipped with the liquid crystal display device according to any one of the above-mentioned exemplary embodiments is described below.

Figure 14:
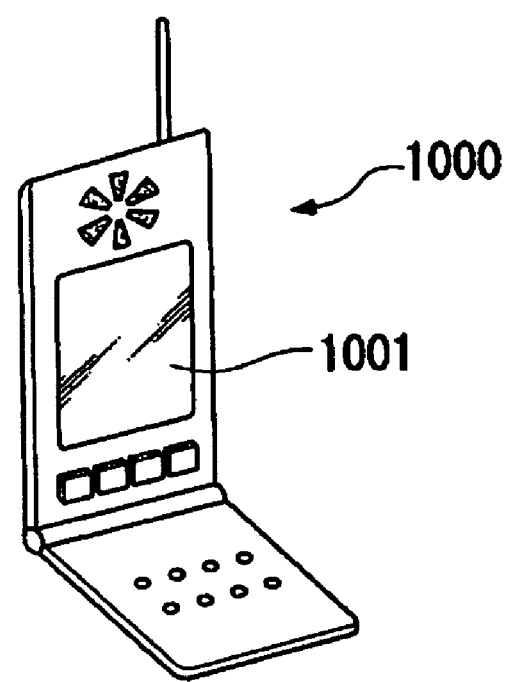
FIG. 14 is a perspective view illustrating an example of an electronic apparatus according to an exemplary embodiment of the present invention.

FIG. 14 is a perspective view illustrating an example of a mobile phone. In FIG. 14, reference numeral 1000 indicates a main body of the mobile phone, and reference numeral 1001 indicates a display unit using the above-mentioned liquid crystal display device. When the liquid crystal display device according to any one of the above-mentioned exemplary embodiments is used for the display unit of an electronic apparatus, such as a mobile phone, it is possible to achieve an electronic apparatus equipped with a liquid crystal display unit capable of exhibiting excellent display characteristics in a specific viewing angle.

Furthermore, the present invention is not limited to the above-mentioned exemplary embodiments, and can be appropriately modified within the scope of the present invention without departing from the subject matter or concept of the present invention read on the claims and the specification. For example, the present invention has been applied to an active matrix liquid crystal display device in which TFDs are used as switching elements, but may be applied to an active matrix liquid crystal display device in which TFTs are used as switching elements. In addition, in the above-mentioned exemplary embodiments, when TFT elements are used as switching elements, the TFT elements can be connected to the pixel electrodes formed on the inner surface of the lower substrate 10, and the common electrode 9 can be provided so as to cover the entire inner surface of the upper substrate 25.

What is claimed is:

1. A liquid crystal display device, comprising:
   a pair of substrates; and
   a liquid crystal layer interposed between the pair of substrates, display being performed in predetermined dot regions,
   the liquid crystal layer including liquid crystal having negative dielectric anisotropy that is vertically aligned in an intial state; a pixel electrode being formed into a plurality of island-shaped sub-dot regions in each dot region, the pixel electrode electrically connection the sub-dot regions to each other through connecting portions,
   each sub-dot region being provided with a single alignment regulating device to regulate an alignment direction of the vertically aligned liquid crystal molecules such that the liquid crystal molecules are inclined substantially in a radical direction around the alignment regulating device, and
   each alignment regulating device being arranged to deviate from a center of the sub-dot region.

2. The liquid crystal display device according to claim 1, the alignment regulating device being convex portions formed on a surface of at least one of the pair of substrates facing the liquid crystal layer.

3. The liquid crystal display device according to claim 1, further including electrodes formed on both surfaces of the pair of substrates facing the liquid crystal, and
   the alignment regulating device being electrode slits, each formed by partially cutting off the electrode that is formed on at least one of both the surfaces of the pair of substrates facing the liquid crystal layer.

4. The liquid crystal display device according to claim 1, the alignment regulating device having a shape that is in point symmetry or substantially in point symmetry with respect to its center in plan view.

5. The liquid crystal display device according to claim 1, the alignment regulating device having at least one of a circular shape, a regular polygonal shape, a substantially circular shape, and a substantially regular polygonal shape in plan view.

6. The liquid crystal display device according to claim 1, the sub-dot region having a shape that is in point symmetry or substantially in point symmetry with respect to its center in plan view.

7. The liquid crystal display device according to claim 1, the sub-dot region having at least one of a circular shape, a regular polygonal shape, a substantially circular shape, and a substantially regular polygonal shape in plan view.

8. The liquid crystal display device according to claim 1,
the planar shape of the alignment regulating device being similar to or substantially similar to the shape of the sub-dot region.

9. The liquid crystal display device according to claim 1,
each alignment regulating device being arranged so as to deviate from the center of the sub-dot region, in the direction in which a viewing angle is widened in the display of the liquid crystal display device.

10. The liquid crystal display device according to claim 1,
the pair of substrates being an upper substrate and a lower substrate, and a backlight being formed on a surface of the lower substrate opposite to the liquid crystal layer to display an image on an outer surface of the upper substrate, and
each alignment regulating device being arranged on an inner surface of the upper substrate so as to deviate from the center of the sub-dot region in a direction opposite to the direction in which a viewing angle is widened in the display of the liquid crystal display device.

11. The liquid crystal display device according to claim 1,
the pair of substrates being an upper substrate and a lower substrate, and a backlight being formed on a surface of the lower substrate opposite to the liquid crystal layer to display an image on an outer surface of the upper substrate, and
each alignment regulating device being arranged on an inner surface of the lower substrate so as to deviate from the center of the sub-dot region in a direction similar to the direction in which a viewing angle is widened in the display of the liquid crystal display device.

12. The liquid crystal display device according to claim 1,
when a distance from the center of the sub-dot region to an outer circumference thereof via the center of the alignment regulating device is "y", the center of the alignment regulating device being arranged so as to be separated from the center of the sub-dot region by a distance of 0.05 y to 0.7 y.

13. The liquid crystal display device according to claim 1,
the pair of substrates being an upper substrate and a lower substrate, and
a reflective layer being provided on the other surface of the lower substrate facing the liquid crystal layer, and display being performed by light that is incident on an outer surface of the upper substrate, and then being reflected from the reflective layer.

14. The liquid crystal display device according to claim 13,
when the distance from the center of the sub-dot region to the outer circumference thereof via the center of the alignment regulating device is "y", the center of the alignment regulating device being arranged so as to be separated from the center of the sub-dot region by a distance of 0.5 y to 0.7 y.

15. The liquid crystal display device according to claim 1,
the alignment regulating device in at least two of the plurality of sub-dot regions being located at least one of at different distances and in different directions from the centers of the respective sub-dot regions.

16. The liquid crystal display device according to claim 15,
the plurality of sub-dot regions including sub-dot regions for transmissive display and sub-dot regions for reflective display, and
the alignment regulating device in the sub-dot regions for transmissive display and the alignment regulating device in the sub-dot regions for reflective display being located at least one of at different distances and in different directions from the centers of the respective sub-dot regions.

17. An electronic apparatus, comprising:
the liquid crystal display device according to claim 1.

* * * * *